(No Model.) 8 Sheets—Sheet 2.

F. H. RICHARDS.
GRAIN WEIGHER.

No. 442,719. Patented Dec. 16, 1890.

Witnesses:
Wm. Bjorkman
Henry L. Reckard

Inventor:
Francis H. Richards (No Model.)   F. H. RICHARDS.
GRAIN WEIGHER.

No. 442,719.   Patented Dec. 16, 1890.

Witnesses:
W. M. Bjorkman
Henry L. Reckard

Inventor:
Francis H. Richards

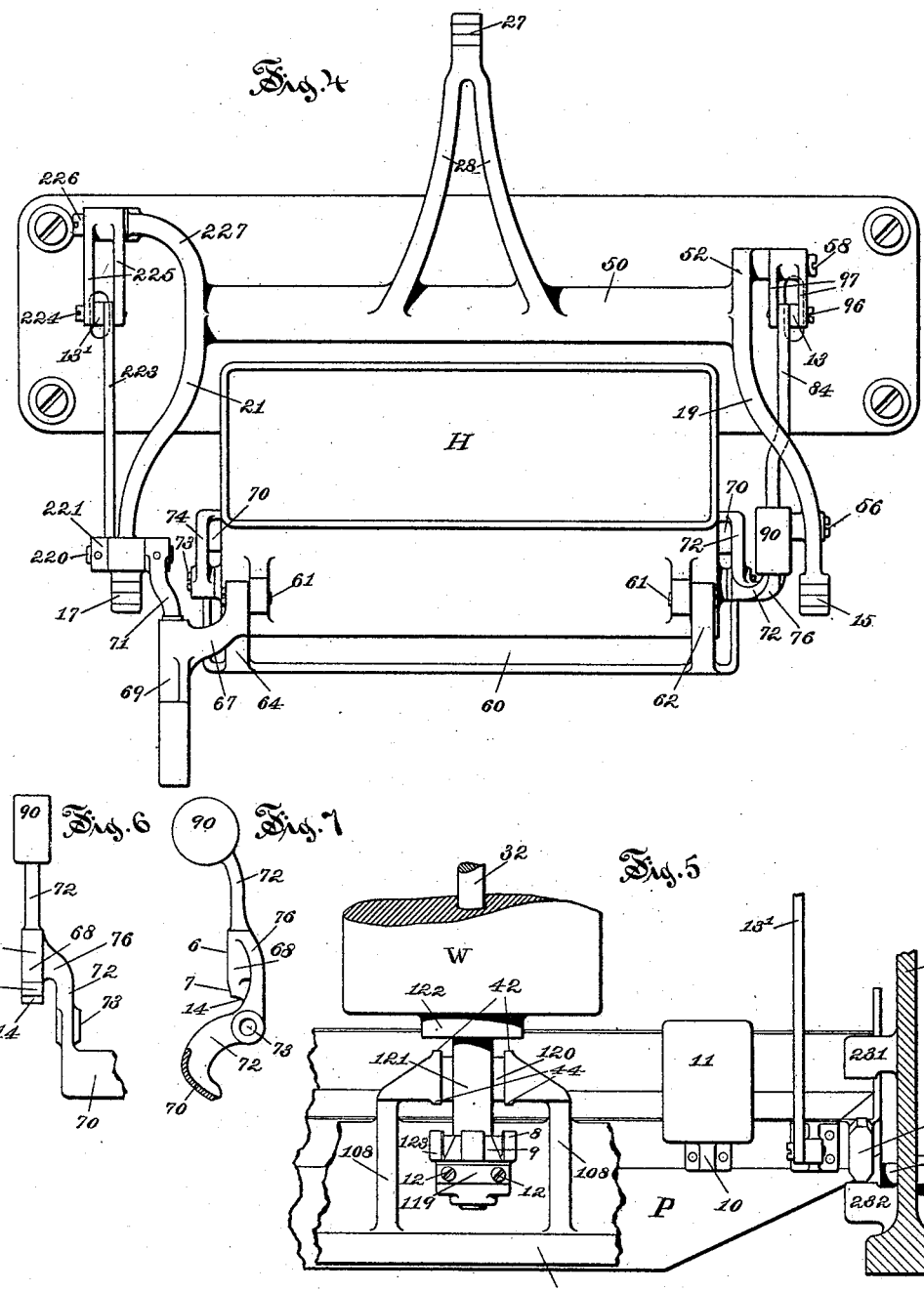

(No Model.) 8 Sheets—Sheet 5.

F. H. RICHARDS.
GRAIN WEIGHER.

No. 442,719. Patented Dec. 16, 1890.

Witnesses:
W. M. Bjorkman
Henry L. Reckard

Inventor:
Francis H. Richards (No Model.)  F. H. RICHARDS.  8 Sheets—Sheet 6.
GRAIN WEIGHER.

No. 442,719.  Patented Dec. 16, 1890.

Witnesses:
W. M. Bjorkman
Henry L. Peckard.

Inventor:
Francis H. Richards (No Model.) 8 Sheets—Sheet 8.

F. H. RICHARDS.
GRAIN WEIGHER.

No. 442,719. Patented Dec. 16, 1890.

Witnesses:
W. M. Bjorkman,
Henry L. Reckard.

Inventor:
Francis H. Richards

UNITED STATES PATENT OFFICE.

FRANCIS H. RICHARDS, OF HARTFORD, CONNECTICUT, ASSIGNOR TO THE PRATT & WHITNEY COMPANY, OF SAME PLACE.

GRAIN-WEIGHER.

SPECIFICATION forming part of Letters Patent No. 442,719, dated December 16, 1890.

Application filed March 28, 1890. Serial No. 345,730. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Grain-Weighers, of which the following is a specification.

This invention relates to automatic grain-weighers of the single-bucket class, the object being to provide an organization of mechanism adapted to be made in large sizes and to have a valve mechanism operating in connection with regulator apparatus.

Figure 1:
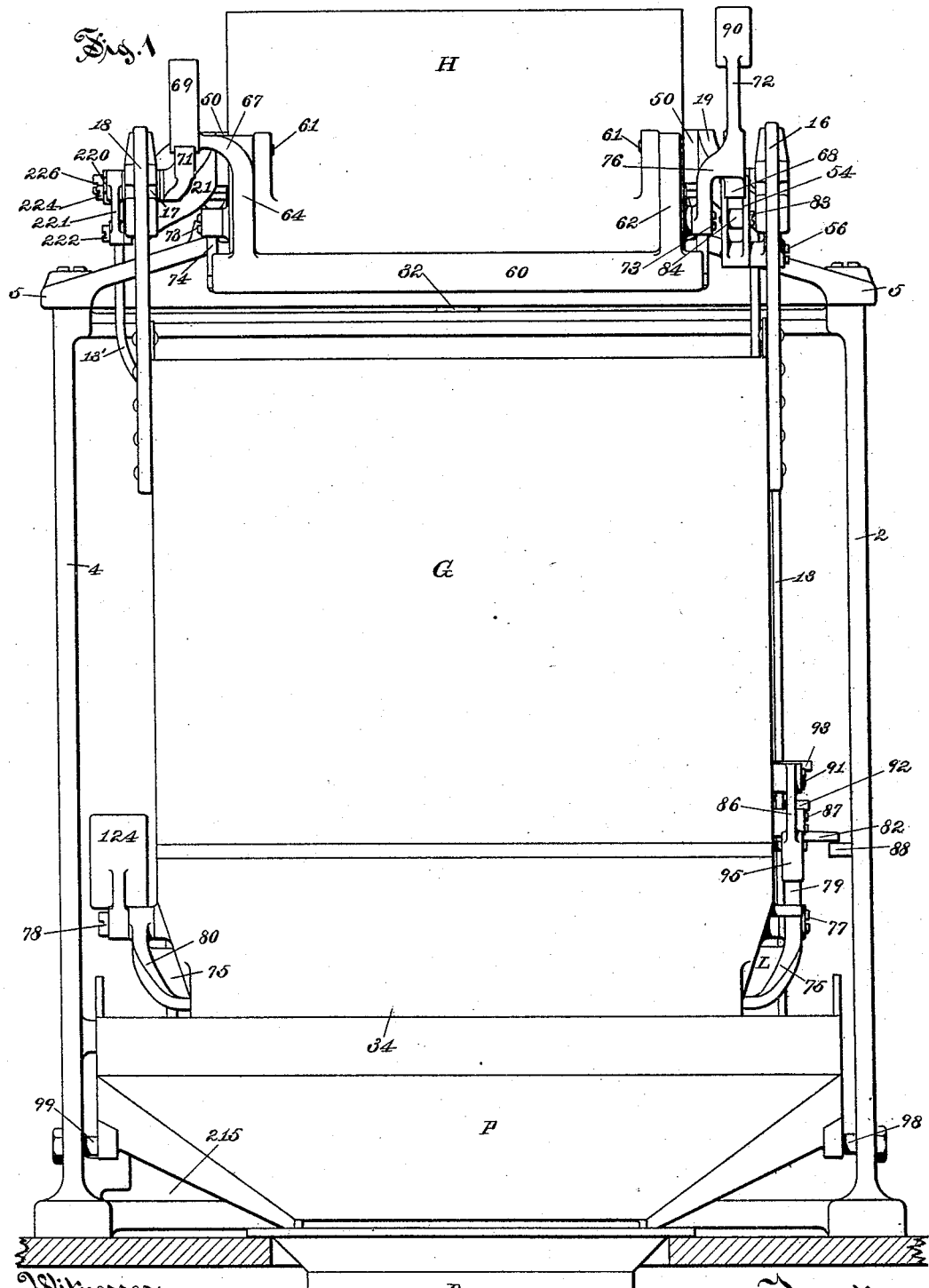
Figure 2:
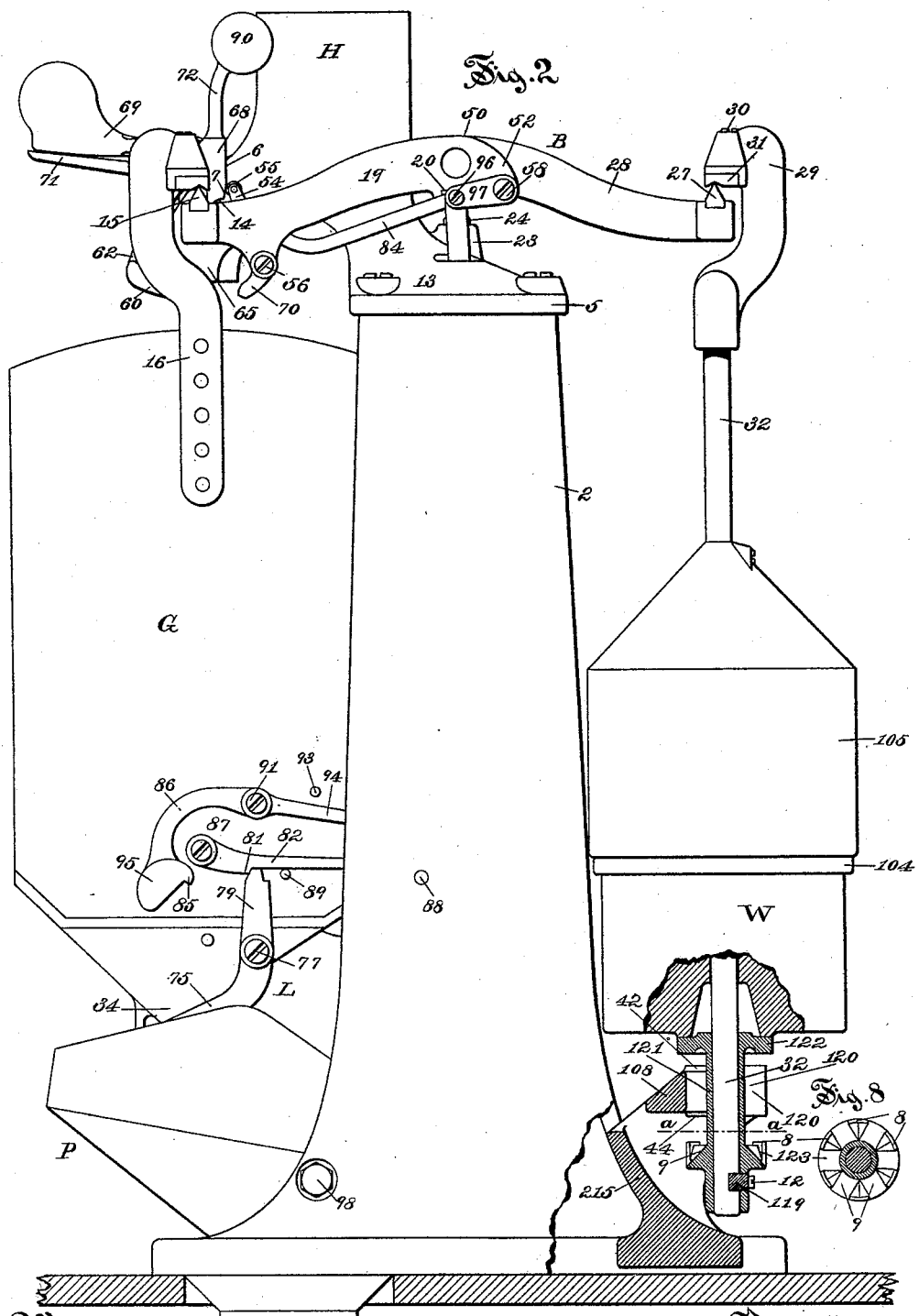
Figure 3:
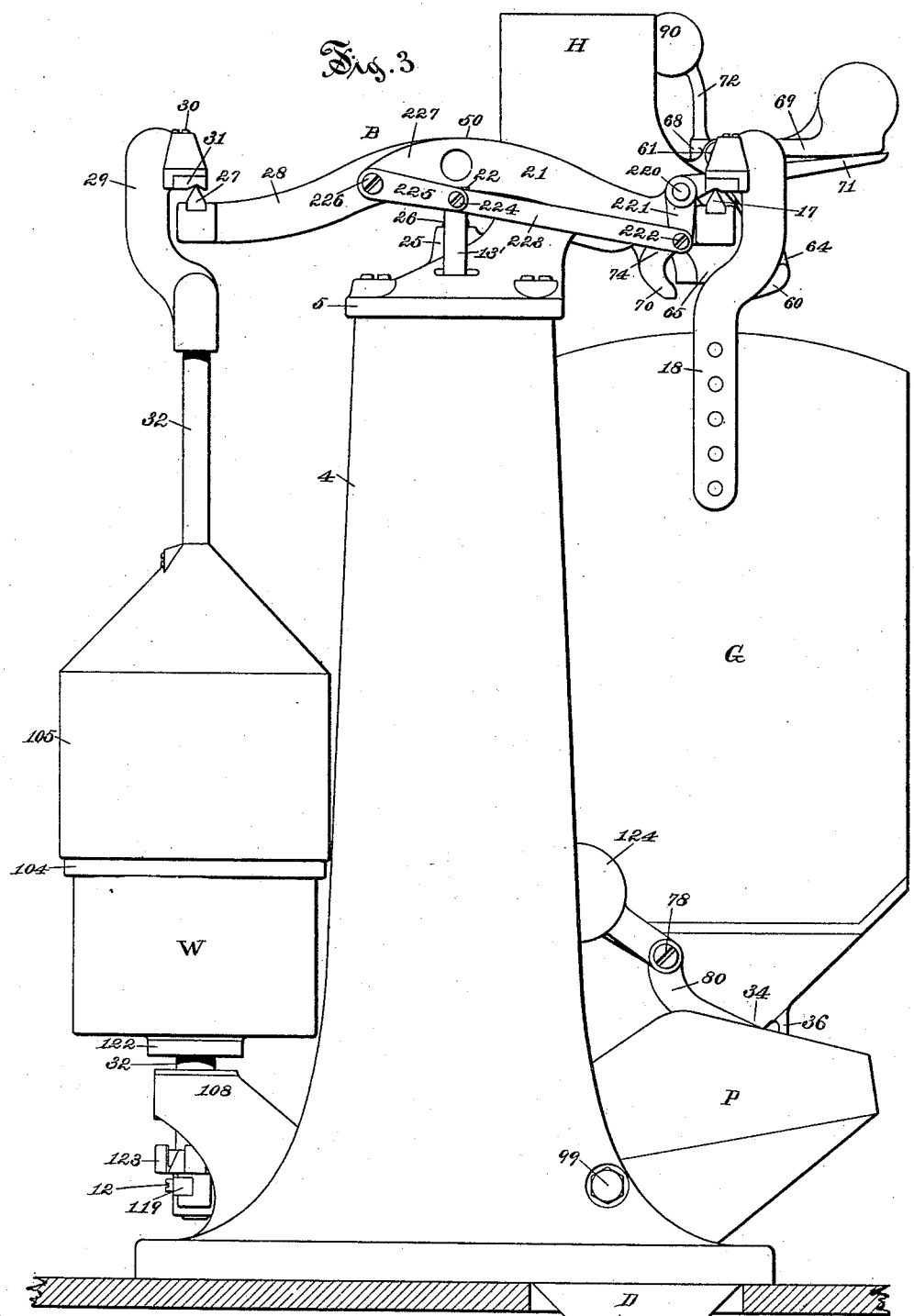

In the drawings accompanying and forming a part of this specification, Figure 1 is a front elevation of a grain-weigher embodying my present improvements. Fig. 2 is a side elevation of the machine as seen from the right hand in Fig. 1, some parts being broken away the more clearly to show the construction. Fig. 3 is a similar view of the left-hand side of the machine. Fig. 4 is a plan view of the parts that are carried by the top plate. Fig. 5 is a rear view of portions of the frame-work, the counter-weight, and some accessory parts. Figs. 6 and 7 are front and side views, respectively, of one end of the cut-off valve, showing the weighted valve-arm and the valve-actuating cam on said arm. Fig. 8 is a detail and top view of the lower weight-rod stop-collar, taken in line $a\ a$, Fig. 2. Figs. 9, 10, 11, and 12 are right-hand side elevations, illustrating the general operation of the machine.

Similar characters designate like parts in all the figures.

The frame-work for carrying the operative parts of this machine usually, and as shown in the drawings, comprises two side frames or uprights 2 and 4, held together by the top plate 5, carrying the supply-chute H, and at the bottom by the beam or part 215, Figs. 1 and 2.

The grain-bucket G is of the single-chambered type or class, and is suspended under the supply-chute H by means of the hangers 16 and 18, that are fixed to the bucket, and are suspended by V-shaped bearings on the pivots or knife-edges 15 and 17, respectively, of the principal arms 19 and 21 of the scale-beam B. This beam has V-shaped bearings 20 and 22, one at each end of the hollow shaft 50 thereof, which rest on the pivots or knife edges 24 and 26, that are suitably supported as by bearings 23 and 25 on the frame-work. Opposite to arms 19 and 21 an arm 28 extends rearwardly of the scale-beam shaft 50, and is provided with a pivot or knife-edge 27, on which the main weight W (also designated as the counter-weight) is suspended by a hook 29.

Figure 11:
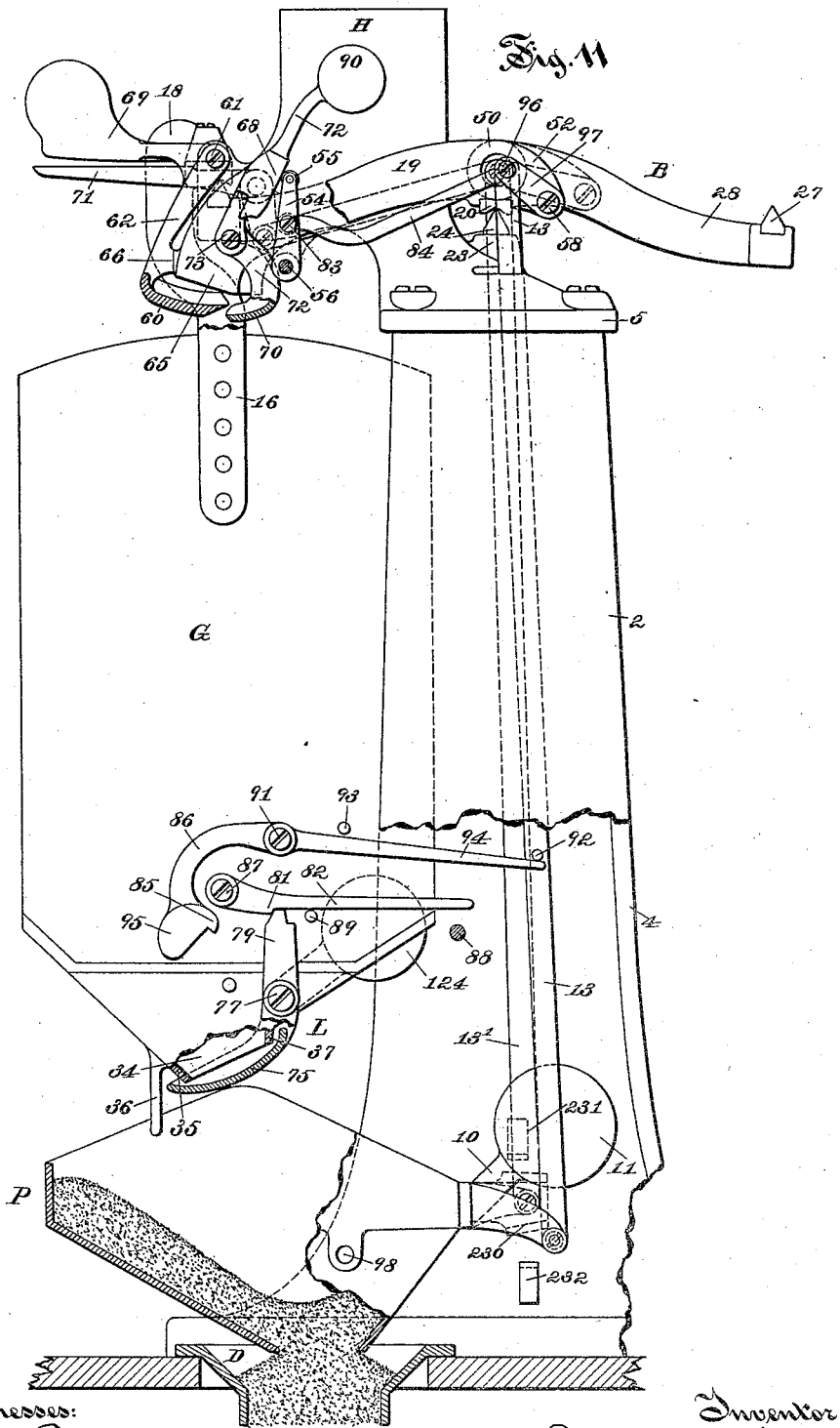
Figure 12:
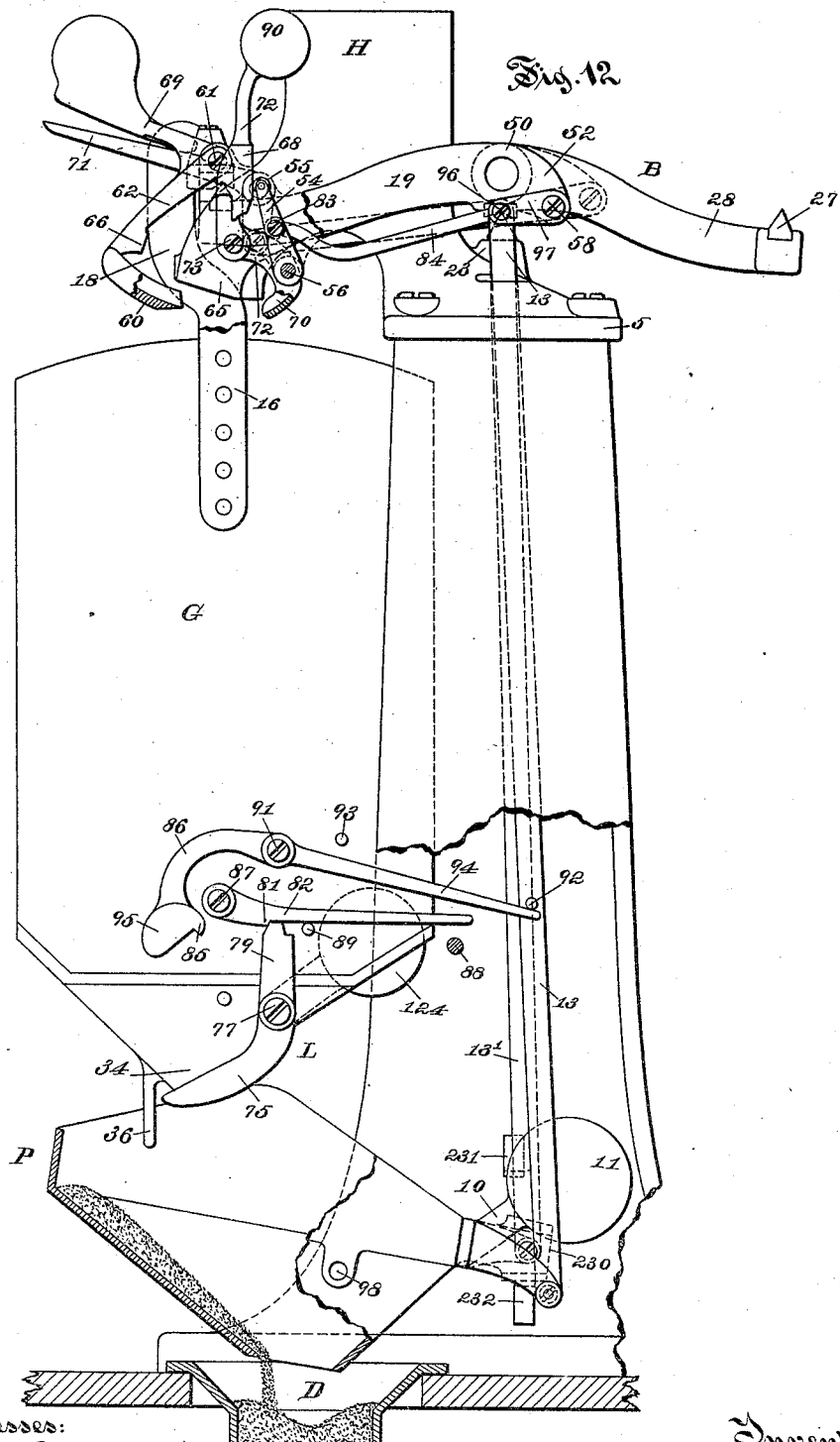

The bucket-closer (designated in a general way by L) consists of the suitably-formed plate or closer proper 75, having the arms 79 and 80, (usually formed integral therewith,) which are pivoted at 77 and 78, respectively, to the bucket G. Said plate is preferably formed cup-shaped, as shown, so as to hold the grain without closing against the edges 35 and 37 of the bucket-spout 34, but closes under said spout-edges and contiguous to the guard 36, so that the grain is kept from leaking out without requiring close-fitting of said parts, as shown in Fig. 11. The arm 79 extends above the pivot 77 to engage with the catch 81 of the latch 82, and thus lock said closer when this is closed, as in Fig. 2, and to engage with the catch 85 of the latch 86 for locking said closer when open, as in Fig. 9. The latch or lever 82, which is pivoted at 87 to the bucket, extends rearwardly to engage with the pin 88, that is fixed in the upright 2 of the frame-work, unlocking the closer on the descent of the bucket. A stop-pin 89, fixed in the bucket, limits the downward movement of said latch when the closer is open. The latch or lever 86 is pivoted at 91 to the bucket and extends rearwardly to engage with the pin 92, that is fixed in the rod 13 for unlocking the closer on the rising of the hopper P. A stop-pin 93, fixed in the bucket, limits the upward movement of the inwardly-projecting arm 94 of said latch 86, which arm is held nominally in contact with said pin 93 by means of the weighted end 95 of the said detent-latch. A suitable weight, as 124, is provided to normally close the bucket-closer 75.

Figure 9:
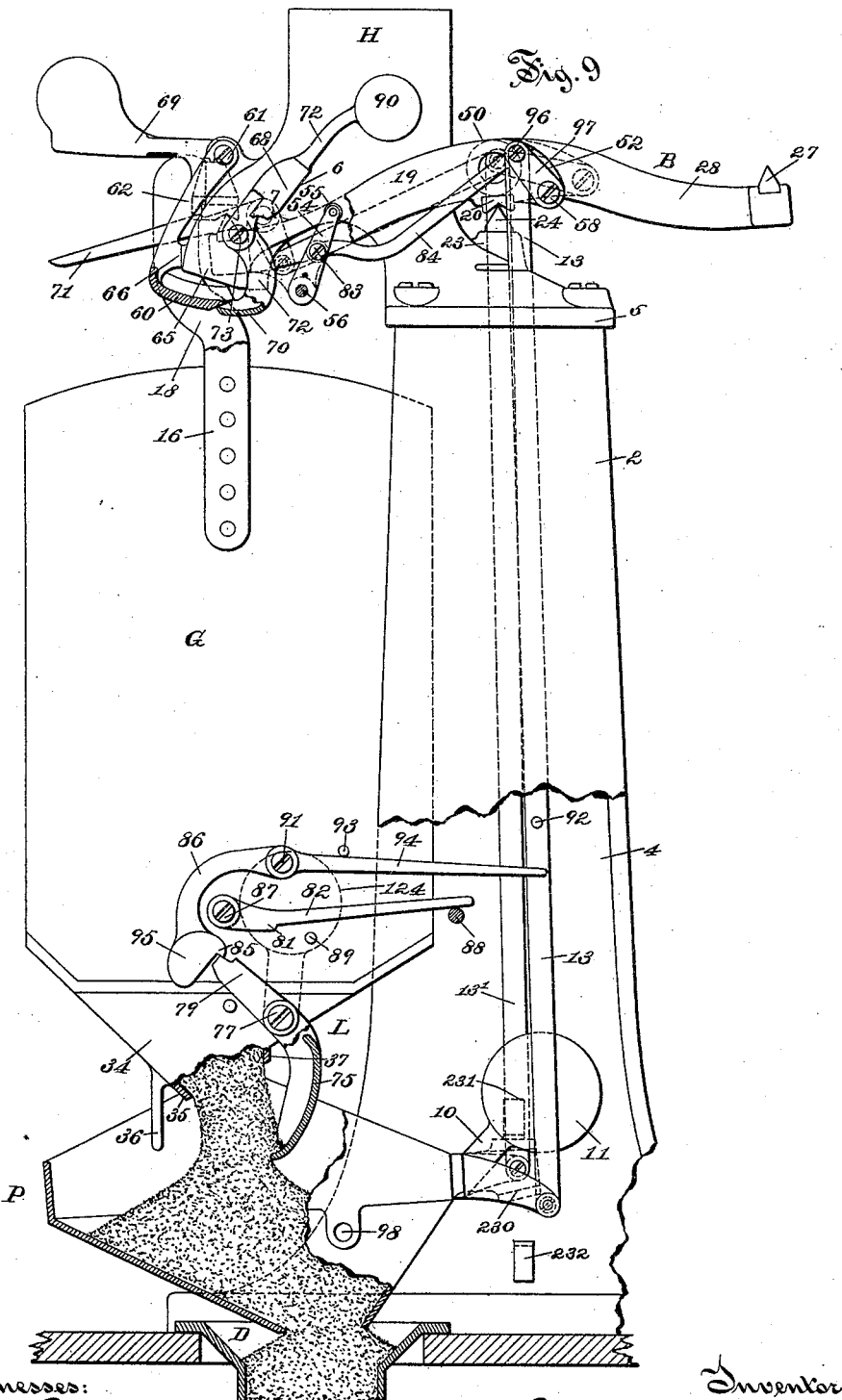
Figure 10:
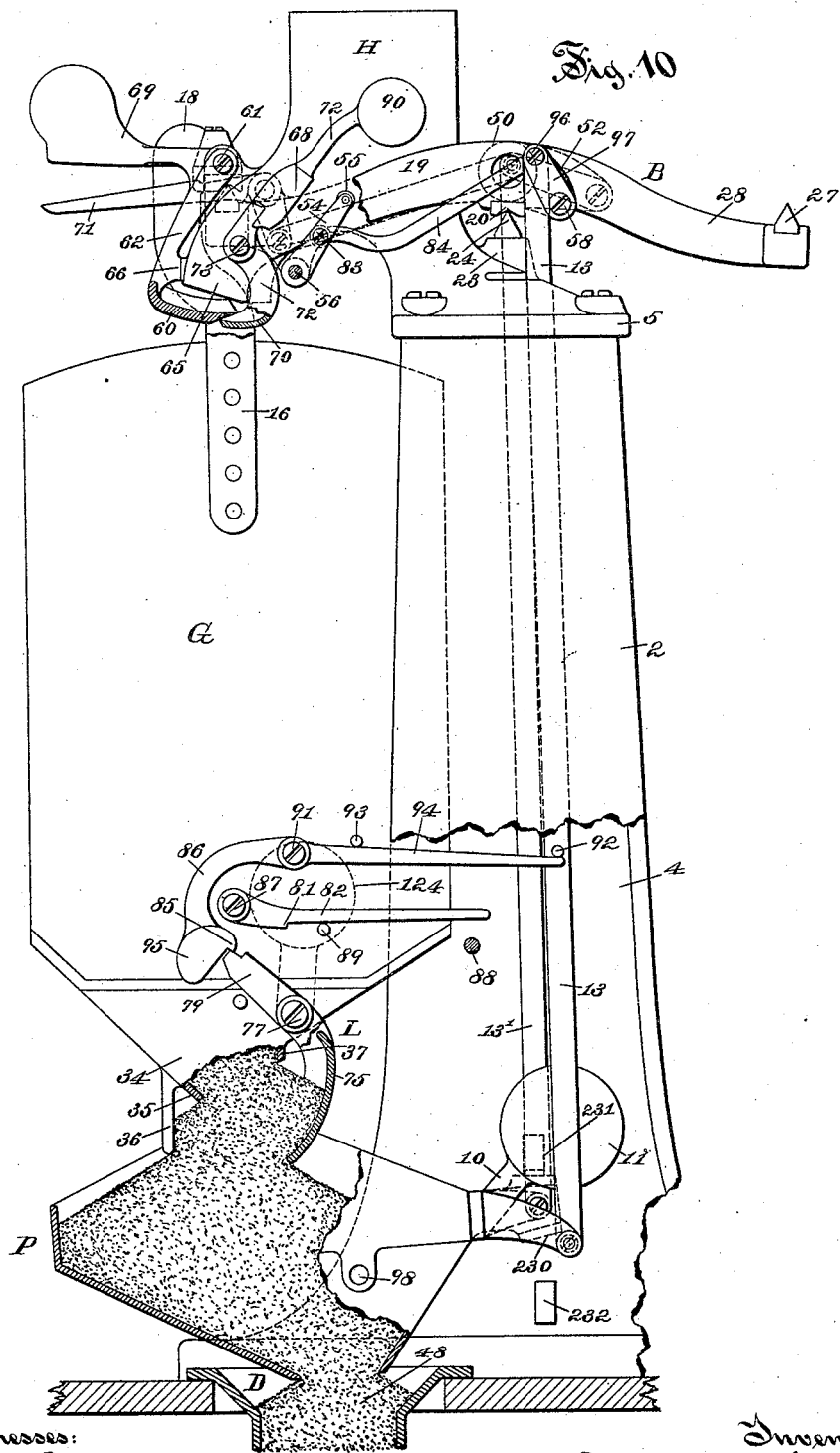

The particular construction and arrangement herein set forth of the bucket-spout and the combination therewith of the bucket-closer is best illustrated as to the object and utility thereof in Figs. 9 and 10. The edge 35 being lower than the edge 37, the grain is directed thereby against the closer 75, as there shown, and thus acts directly and strongly to complete the opening movement of said closer by the pressure of the grain thereon, thus insuring the locking open of said closer by the detent-latch 86 by continuously acting on the closer until and after the same is fully opened. By this means ample power is obtained for raising the weight 124, which, on the unlocking of said latch 86, operates to promptly shut the said closer.

The guard 36, in addition to the function of preventing leakage, as above mentioned, acts in conjunction with the opened closer, as clearly shown in Fig. 10, to control the direction of the outflow of grain into the regulator-hopper, and also increases, as there well shown, the accumulation of grain against the closer.

One feature of my present improvements relates to the construction of the reducing-valve, whereby it is furnished with arms, one at either end of the valve-blade, which arms are constructed for pivotally supporting said blade, and whereby it is provided with a reducing-cam set on a radius crosswise to the valve radius, which cam is joined to the valve-arm by an outreaching arm from said valve-arm. By means of this construction provision is made for operating the valve from the beam-arm 71, extending across the line of the valve-axis beyond the valve-blade, and for so doing without transmitting the strains through any joints, since in this form the valve, together with its said arms and cam, may be an integral structure, thereby securing also efficiency and low cost of manufacture. The valve-arms 62 and 64 rise from either end of the valve-blade 60, and are bored at their upper ends for the valve-supporting pivots. Said valve is carried by said arms on the pivots 61 61, which are removably fixed in the frame-work, said valve being furnished with a suitable stop, as 66, Fig. 9, to limit the closing movement thereof.

The valve 60 is furnished with the valve-lever 69, which is operated by the scale-beam and also by the hopper through the arm 71 and its connections, in a manner hereinafter described. The lever 69 is carried by an outreaching arm 67, and is usually weighted either by a weight formed thereon, as shown in the drawings, or by a weight attached thereto. As herein shown and described, the valve 60, together with its arms and the valve-lever 69, is an integral structure adapted to be cast of iron in a single piece and is in the nature of an improvement on the reducing-valve described in the prior application of C. H. Cooley, Serial No. 338,818, filed January 31, 1890.

The cut-off valve 70 is a concaved valve-blade, and is carried by the arms thereof 72 and 74, which rise from the concave side of said blade and are pivoted at 73 73 in the sides of the supply-chute H. The arm 72 extends above said pivot and has formed thereon the cut-off-valve cam 68, which arm, continuing upward, is provided with a suitable weight, as 90. The preferred construction, the utility, and the mode of operation of the cam 68 are matters fully set forth in the application of C. H. Cooley and F. H. Richards, Serial No. 339,967, filed February 11, 1890, to which reference may be had. It will be observed that the cam 68 has three faces 6, 7, and 14. The part 6 of the cam-face is used during the closing of the reducing-valve, the part 7 is used during the poising period and is substantially coincident in extent with the poising movement of the beam, and the part 14 is used to cut off the "drip" and to effect the discharge of the bucket-load of grain. The cam 68 (similarly to the cam-arm 69 of the reducing-valve) is set beyond the end of the valve, as in Fig. 6, being carried by the outreaching part 76 of the arm 72. By means of this construction space is obtained for the working of the valve-actuator arm 54 across the line of the valve-axis and outside of the valve and its pivot 73, as shown in Fig. 1. The valve-actuator, as herein shown, is a small roller 55, carried by the actuator-arm 54, which is pivoted at 56 to the arm 19 of the beam B. Said actuator-arm 54 has pivotally attached thereto at 83 a connecting-rod 84, whose opposite end is connected at 96 to the arm or link 97, which is pivoted at 58 to an arm 52, that is formed on the scale-beam. The rod 13 is also pivoted at its upper end at 96 to the link 97, and at its lower end to the hopper P. By this means the hopper by its vertical movement operates the links 84 and 97, after the manner of a toggle-joint, to shift the said valve-actuator from its operative position in Figs. 2 and 12 to its inoperative position. (Shown in Figs. 9, 10, and 11.) This feature of my present invention, whereby automatic regulation of the machine is effected, is described and claimed in my prior application, Serial No. 340,814, filed February 17, 1890, to which reference may be had. It will of course be understood that the oscillating movement of the hopper P is to be limited by some suitable stop devices—as, for instance, those shown in Figs. 5 and 9 to 12, inclusive. In the preferred arrangement thereof shown in said views a stop-arm 230 is fixed to or formed on the hopper, and suitable stops or abutments, as 231 and 232, are formed on the inner side of the upright 4 of the frame-work.

The beam-arm 71, above referred to, is fixed by a pin or otherwise to the stud 220, that is journaled in a suitable bearing formed on the arm 21 of the scale-beam. A short arm 221 is fixed in a similar manner to the outer end of said stud, and has pivotally attached thereto at 222 one end of a rod 223, whose opposite end is pivoted at 224 to an arm or link 225, which is pivotally connected at 226 to the arm 227, that is formed on the scale-beam. A rod 13', similar to rod 13, is connected at 224 to the rod 223 and the arm 225, the lower end of said rod being pivotally connected to the hopper P. (See Figs. 3 and 5.) Said hopper is pivoted at 98 and 99 to the frame-work, and has an arm 10, fixed thereto and provided with the usual counter-weight 11 of sufficient mass to open the valves when the hopper P is empty of grain. The arm 71 thus operated is a "shiftable valve-actuator" for the reducing-valve, and as such is described and claimed in my said prior application, Serial No. 340,814, filed February 17, 1890, and also in my prior application, Serial No. 341,196, filed February 20, 1890, to which reference may be had.

For counterbalancing the bucket mechanism and its load of grain, I employ the improved weight described and claimed in the joint application of C. H. Cooley and F. H. Richards, Serial No. 339,967, filed February 11, 1890, to which reference may be had. The main weight is designated in a general way by W, and is suspended from the scale-beam by a rod 32, on which the said weight is freely fitted. The circular cover 104 and the cylindrical cover 105 are or may be the same as the corresponding parts similarly designated in said prior application; but these several details are not essential to my present invention. The suspension-rod 32 is provided with the hook 29, that is fitted with a V-shaped bearing 31, (similar to the bearings at the upper ends of the hangers 16 and 18,) which is secured thereto by a screw 30. The said bearing rests on the knife-edge 27 of the scale-beam B, and thus supports said main weight during the upward movement of the beam-arm 28. For supporting said weight when the same is down, a suitable shelf or bracket, as 108, is provided on the framework, and improved devices are also provided, operating in connection with said bracket for limiting the ascending and descending movements of said weight and of the scale-beam and the grain-bucket.

It is to be understood that when reference is herein made to the movement of the scale-beam the movement of the bucket-supporting arms thereof is meant, this coinciding, of course, with the movement of the bucket itself.

The bracket 108 is formed on or secured to the frame-work, and has formed therein the slot or opening 120, through which passes the rod 32 and the sleeve 121 on said rod. Said sleeve is fixed to the lower end of the rod 32 by means of a key 119, which is let into a slot extending across both the sleeve and rod, as shown in section in Fig. 2. On the upper end of said sleeve (which is held in place by screws 12) there is formed a flange or collar 122, on which rests the weight W, and on the lower end there is formed a flange 123, that is constructed substantially as shown in the drawings, so that no grain can lodge thereon and thereby interrupt the operation of the machine. The flanges 122 and 123 limit the downward and upward movements, respectively, of the weight W by their contact with the upper and lower ribs 42 and 44, respectively, on the said bracket 108, contiguous to the said slot 120. The flange 123 has a narrow external rim formed in short sections 8, which are separated by the inclined surfaces 9, as shown in Figs. 2, 3, and 5. The rim-sections 8 being so narrow, the grain does not readily lie thereon, and the ribs 44 being also narrow any grain on the flange 123 is discharged with great certainty when this flange rises against said ribs. It has been found experimentally that this improvement is very reliable and effective for its intended purpose, so that any wheat or corn thrown accidentally or designedly onto the flange quickly runs off or is dislodged, and does not obstruct the machine. It has also been found that with a plain collar in place of said specially-constructed flange the machines in commercial work are subject to frequent stoppages from said cause. For it will be remembered that any grain between the said flange and its stop-surfaces would reduce the descending movement of the scale-beam and the bucket, so that the cam 68 could not properly act upon the beam to accelerate the downward movement thereof, and so that the stops 88 could not unhook the latches 82 for discharging the load.

The manner of connecting the sleeve 121 to rod 32 has an important utility, in that it provides for the necessary assembling and disassembling of the parts without giving any opportunity for misadjusting them, so that when the machine is once correctly constructed it may be sent disassembled to distant places and be properly put together by unskilled workmen without danger of vitiating the accuracy of the machine by improper adjustment.

The general operation of this improved grain-weigher may be described as follows: When the bucket G is receiving the first part of a load of grain, (the hopper P being up, as in Fig. 2,) the beam is up, both the valves are open, and the closer 75 is closed, being locked by means of the latch 82. Both valves being open, the grain flows freely and rapidly from the outlet 65 of the supply-chute H into the bucket. When the major part of a load of grain has been deposited in the bucket, the beam descends to the poising-point, as shown in Figs. 2 and 3. This descent of the beam allows the reducing-valve 60 to close, thereby reducing the flow of grain into the bucket to a drip. On the full load being made up by the drip the beam further descends and the cut-off valve 70 is closed, and on the descent of the beam below the poising-point the latch 82 strikes the pin 88, thus unlocking the bucket-closer, which is then opened by the weight of the grain in the bucket and locked open, as in Fig. 10. The closer being thus opened, the grain is discharged from the bucket into the regulator-hopper P, as illustrated in Fig. 9. The discharge-spout 34 of the bucket has an emptying capacity a little in excess of the continuously-open outlet of the regulator-hopper, so that the accumulation of grain therein at once lowers said hopper, which operates to push up rods 13 and 13', and through these and their connections above described to shift the valve-actuators 55 and 71 into their inoperative positions, and allowing the weight 90 to throw fully over, and thus hold the valve 70 tightly closed against the valve 60, as in Fig. 9. The said shifting of the valve-actuators 55 and 71 allows the beam to rise without opening the valves, and before the load has been fully discharged from the bucket, as shown in Fig. 10. When the load of grain has been fully discharged from the bucket into the hopper P, and when the major part of said discharged grain has also passed out therefrom, said hopper gradually rises and first operates to draw down the rod 13, so that the pin 92, which is fixed in said rod, strikes the arm 94 of the latch 86, thereby disengaging said latch from the arm of the closer and allowing said closer to be closed by means of the weight 124 attached thereto, said closer being immediately locked closed by the latch 82, all as shown in Fig. 11. On the further discharge of the grain from the hopper, as in Fig. 2, the hopper rises with greater force, and operates through the rods 13 and 13' and the connections described to open both the valves, as shown in Fig. 12, when the grain again flows freely into the grain-bucket, and the above-described operations are repeated.

If at any time during the use of the machine the grain should remain in the hopper P, as in Fig. 10, by reason of the grain at 48 in the conduit D being stationary, the valves will remain closed and the machine stand idle; but whenever the grain is lowered in said conduit the grain in the hopper descends, the hopper rises and opens the valves, and the machine starts into operation. Thus the regulator P is not merely a regulator, but is a part of the valve-actuating mechanism, which feature is one part of my present invention.

Having thus described my invention, I claim—

1. In a grain-weigher, the combination, with the counterweighted scale-beam carrying the bucket, of reducing and cut-off valves actuated from said beam through shiftable actuators, one for each valve, the regulator below the bucket, and actuator-shifting devices operatively connecting said regulator with each said actuator.

2. In a grain-weigher, the combination, with the scale-beam and the grain-bucket carried thereby, of the bucket-closer having a lock-arm, latch for locking said closer shut, a detent-latch for locking the closer open, the regulator, and a connection from the regulator to unlock said detent-latch on the rising of the regulator.

3. In a grain-weigher, the combination, with the grain-bucket having the spout thereof with one edge below the other edge, and with means for locking open the closer, of the closer pivotally supported on the bucket adjacent to the upper edge thereof and arranged to close under the lower edge thereof, and a stop limiting the opening movement of the closer, whereby the discharging grain impinges against the closer when it is full open for insuring the locking open thereof.

4. In a grain-weigher, the combination, with the bucket having the inclined discharge-spout, of the closer pivotally supported adjacent to the upper edge of said spout and arranged to close under the lower edge thereof, the guard 36, set on said spout forward of the lower edge thereof and contiguous to the lower edge of the closer when this is shut, and a stop limiting the opening movement of the closer, substantially as shown, to bring its lower edge in substantially the horizontal plane of the lower edge of said guard, whereby the discharging grain is directed against the closer for insuring the complete opening thereof, and whereby said guard and closer together form guides controlling the direction of the outflow of grain into the regulator-hopper below the bucket.

5. In a grain-weigher, the combination, with the grain-bucket, of the closer L, pivoted thereto and having the lock-arm, the latch 82, a stop actuating said latch on the descent of the bucket, the detent-latch 86, and means, substantially as described, operating to unlock said detent-latch when the bucket is up.

6. In a grain-weigher, the combination, with the grain-bucket, of the closer pivoted thereto and having the lock-arm, the latches locking said closer open and shut, the hopper P, the rod 13, constructed to actuate one said latch, and a fixed stop located to operate the other said latch.

7. In a grain-weigher, the combination, with the scale-beam, of valve mechanism actuated therefrom through a shiftable actuator, the grain-bucket, and the closer therefor, the regulator-hopper below the bucket, and connections from the hopper to the closer detent-latch and to the valve-actuator, whereby the opened closer is unhooked on the earliest upward movement of the hopper and next the valves are opened.

8. In a grain-weigher, and in combination substantially as described, the improved cut-off valve herein described, it consisting in the concaved valve-blade, the arms rising from the concave side of said blade and constructed for pivotally supporting the same, and the extended or weight arm carrying the horizontally-outreaching cut-off cam 68, having the poising face and the cut-off face below said poising face.

9. In a grain-weigher, and in combination substantially as described, the improved cut-off valve herein described, it consisting in the valve-blade, the arms rising from either end of said blade and constructed for pivotally supporting the same, the outreaching cut-off cam on said arm, and the weight-arm extending upward from said cam and provided with the beam-actuating weight.

10. In a grain-weigher, and in combination substantially as described, the improved reducing-valve herein described, it consisting in the valve-blade, the arms rising from either end of said blade and constructed for pivotally supporting the same, the reducing-cam set beyond the valve-blade, and the outreaching connecting-arm rigidly joining one said valve-supporting arm and the said cam, the valve radius and the cam radius being set in crosswise directions.

11. In a grain-weigher, the combination, with the scale-beam and the cut-off valve having cam 68 set beyond the end of said valve, of the actuator-arm 54, pivoted to the beam and carrying the roll 55, and located to swing by the end of said valve, and means actuating said arm on its said pivot.

12. In a grain-weigher, the combination, with the scale-beam having the stud 58, and having the arm 19, carrying the pivot 56, and with the cut-off valve pivotally supported and having the cam 68, outreaching, as set forth, of the actuator-arm 54, carrying the valve-actuator and having pivot 83, and toggle-links connecting from said pivot 83 to the stud 58.

FRANCIS H. RICHARDS.

Witnesses:
HENRY L. RECKARD,
W. M. BYORKMAN.